United States Patent
Baxley et al.

(10) Patent No.: US 10,473,749 B1
(45) Date of Patent: Nov. 12, 2019

(54) LOCALIZATION OF MOBILE HIGH-SPEED WIRELESS USER EQUIPMENT FROM UPLINK CHANNELS

(71) Applicant: Bastille Networks, Inc., Atlanta, GA (US)

(72) Inventors: Robert Baxley, Atlanta, GA (US); Sandor Szilvasi, Atlanta, GA (US); Luke Harwood, Decatur, GA (US); Roy S. Thompson, III, Marietta, GA (US); Sebastian Balint Seeber, San Francisco, CA (US); Christian Sepulveda, San Mateo, CA (US)

(73) Assignee: Bastille Networks, Inc., Atlanta, GA (US)

( * ) Notice: Subject to any disclaimer, the term of this patent is extended or adjusted under 35 U.S.C. 154(b) by 0 days.

(21) Appl. No.: 16/151,293

(22) Filed: Oct. 3, 2018

(51) Int. Cl.
| | |
|---|---|
| *G01S 5/00* | (2006.01) |
| *G01S 5/02* | (2010.01) |
| *H04B 17/391* | (2015.01) |
| *H04B 17/318* | (2015.01) |
| *H04W 72/04* | (2009.01) |

(52) U.S. Cl.
CPC .......... *G01S 5/0054* (2013.01); *G01S 5/0263* (2013.01); *H04B 17/318* (2015.01); *H04B 17/391* (2015.01); *H04W 72/0413* (2013.01)

(58) Field of Classification Search
CPC .................. G01S 5/0054; H04W 72/0413
USPC ............................................ 455/456.1, 404.2
See application file for complete search history.

(56) References Cited

U.S. PATENT DOCUMENTS

| | | | | |
|---|---|---|---|---|
| 8,345,597 | B2 * | 1/2013 | Poisel ................. | G01S 5/04 342/367 |
| 2012/0140760 | A1 * | 6/2012 | Schmidt ............... | H04B 1/707 370/344 |

* cited by examiner

*Primary Examiner* — Chuck Huynh
(74) *Attorney, Agent, or Firm* — Long Technology Law, LLC; Joseph L. Long

(57) ABSTRACT

Systems and methods can support determining the physical position of a wireless device. Radio frequency sensors may be positioned within an electromagnetic environment where user equipment devices are serviced by a base station. The radio frequency sensors can receive wireless uplink signals transmitted from the user equipment devices to the base station. Data samples can be generated from the received signals. The data samples may be partitioned in time and frequency to generate spectrum tiles. The spectrum tiles may be statistically aggregated to reduce the quantity of data samples. A clustering algorithm may be applied to the statistically aggregated spectrum tiles to determine clusters of spectrum tiles. Signal parameters associated with respective clusters of spectrum tiles may be computed. Physical locations associated with user equipment devices can be estimated from the signal parameters associated with the respective clusters of spectrum tiles.

20 Claims, 9 Drawing Sheets

LOCALIZATION OF MOBILE HIGH-SPEED WIRELESS USER EQUIPMENT FROM UPLINK CHANNELS

BACKGROUND

Mobile, high-speed wireless communication systems, such as those employing the Long-Term Evolution (LTE), 4G, or 5G standards, transfer large bandwidths of data using complex protocols and modulation schemes. The huge amounts of data involved and high transmission rates make it difficult to monitor and analyze the associated wireless channels. For example, it remains challenging to determine how many user equipment devices are in use or to estimate locations for those user equipment devices.

There is a need in the art for radio frequency signal collection and signal processing techniques that can reduce the complexity of analyzing radio signals associated with mobile, high-speed wireless communication systems, such as those employing LTE, 4G, or 5G standards. There is a need to reduce the data volume of signal samples while retaining information useful to quantify user equipment devices, time align signals across multiple sensors, and to cluster signal readings for localization of the user equipment devices.

SUMMARY

In certain example embodiments described herein, methods and systems can support determining the physical position of a wireless device. Radio frequency sensors may be positioned within an electromagnetic environment where user equipment devices are serviced by a base station. The radio frequency sensors can receive wireless uplink signals transmitted from the user equipment devices to the base station. Data samples can be generated from the received signals. The data samples may be partitioned in time and frequency to generate spectrum tiles. The spectrum tiles may be statistically aggregated to reduce the quantity of data samples. A clustering algorithm may be applied to the statistically aggregated spectrum tiles to determine clusters of spectrum tiles. Signal parameters associated with respective clusters of spectrum tiles may be computed. Physical locations associated with user equipment devices can be estimated from the signal parameters associated with the respective clusters of spectrum tiles.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

Figure 1:
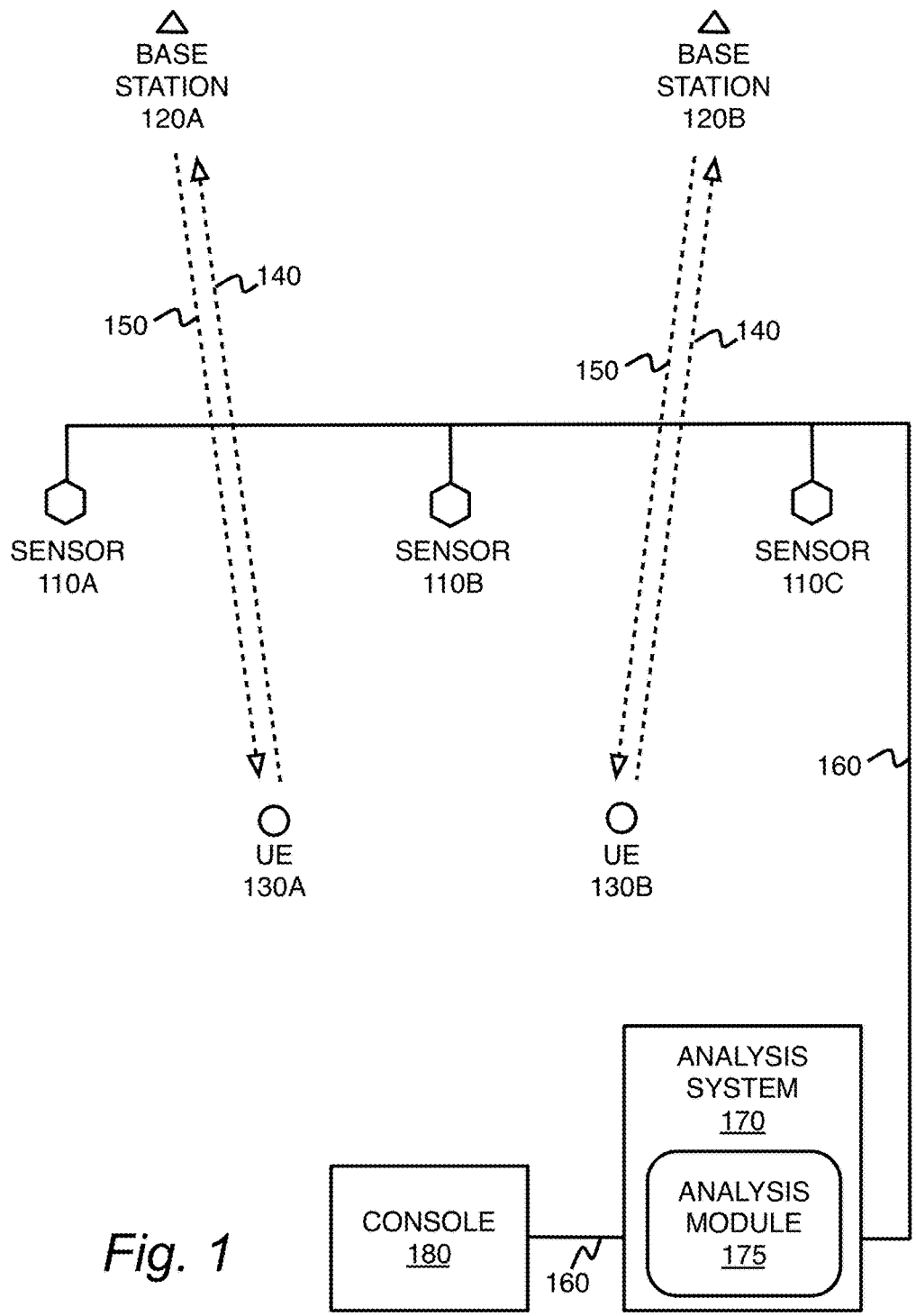
FIG. 1 is a block diagram depicting an electromagnetic environment, sensor, and analysis system in accordance with one or more embodiments presented herein.

The methods and systems described herein enable identification and localization of mobile, high-speed wireless communication systems. One or more radio sensors can collect radio signals associated with mobile, high-speed wireless communication systems, such as those employing LTE, 4G, or 5G standards. The sampled data can be reduced to the spectrum tile or resource block granularity. Using uplink signals only, Fast Fourier Transforms can be applied to the sampled data prior to aggregating the data into spectrum tile chunks (e.g. 7×12 chunks in the case of normal-mode LTE). Aggregation statistics, such as rank statistics or averaging, can be applied to reduce noise. While the resulting quasi-resource blocks may not be exactly aligned to the LTE frame boundary grid, the aggregation can still support statistical analysis with reduced complexity.

Periodically monitoring the downlink signals, each sensor can correlate on a primary synchronization signal (PSS). The PSS is symbol-aligned to a sub-frame boundary. Alignment to the PSS can resolve the frame boundary alignment.

Various features of the signals transmitted in the uplink can be used to localize the corresponding user equipment. These features may include the signal strength of resource blocks, the structure of sounding reference signals (SRS), the structure of demodulation reference signals (DM-RS), the structure of other reference signals, and other such signal features. Sounding reference signal (SRS) correlation can also support the identification of user equipment device resource blocks without processing most of the uplink bandwidth.

Readings across all sensors can be synchronized, or time-aligned. Signal processing may be used to perform pairwise correlation of signals from each sensor, and then to reconcile the correlation outputs to align in time. The precision time protocol (PTP) or other host-based timing protocol may be used for time alignment as well.

The system frame number can be collected from the master information block (MIB) in the downlink signal. This can be done on sensors by periodically monitoring to the downlink and decoding the MIB message. The system frame number can serve as an absolute index that can be used by all sensors and the downlink decoder. The system frame number can be used in place of precise timing where precise timing is unavailable.

Spectrum tiles may be clustered by user equipment instances to either count user equipment devices or to localize the identified user equipment devices. Unsupervised clustering algorithms may be applied to the resource block signal strength values. The downlink may be monitored for downlink grants or system information blocks (SIB) to obtain mappings from radio network temporary identifiers (RNTI) to resource blocks.

Emissions may be localized using both signal processing models and machine learning models.

The functionality of the various example embodiments will be explained in more detail in the following description, read in conjunction with the figures illustrating the program flow. Turning now to the drawings, in which like numerals indicate like (but not necessarily identical) elements throughout the figures, example embodiments are described in detail.

Example System Architectures

FIG. 1 is a block diagram depicting an electromagnetic environment, sensor, and analysis system 170 in accordance with one or more embodiments presented herein. Wireless radio frequency sensors 110A-110C can collect, digest, analyze, and relay radio frequency signals comprising radio uplinks 140 and radio downlinks 150. User equipment devices 130A-130B can communication wirelessly with base stations 120A-120B. Radio signals transmitted from the user equipment devices 130A-130B and received at the base stations 120A-120B may be referred to as radio uplink 140 signals. Radio signals transmitted from the base stations 120A-120B and received at the user equipment devices 130A-130B may be referred to as radio downlink 150 signals.

The user equipment devices 130A-130B may be referred to, in general or collectively, as user equipment devices 130 or a user equipment device 130. The user equipment devices 130 may include handsets, smartphones, tablets, computers, wearable devices, hot spots, internet of things devices, M2M systems, embedded computing devices, building system devices, industrial control/automation systems, physical security systems, security monitoring devices, automotive systems, avionics, point of sales systems, customer localization systems, inventory systems, wireless infrastructure, access control systems, and so forth. The user equipment devices 130 may use GSM, CDMA, satellite, LTE technology, 3G, 4G, 5G, or various other wireless communication technologies.

The sensors 110A-110C may be referred to, in general or collectively, as sensors 110 or a sensor 110. The sensors 110 may collect electromagnetic signals from one or more antennas over a wide bandwidth of radio frequencies. The sensors 110 may utilize hardware-defined radio receivers or software-defined radio receivers. According to various embodiments, these radio receivers can convert received radio frequency energy into digital signals. These digital signals can then be decoded into encoded data streams and processed according to various technologies presented herein.

While hardware-defined radio receivers can be cost-effective and less complex to implement, they may be limited as to what type of encoded data streams they can detect from the electromagnetic environment. For example, a hardware Wi-Fi receiver module or chipset is generally not able to also receive mobile telephone radio signals. In contrast, software-defined radio receivers can much more flexibly receive and decode various data streams within the electromagnetic environment under software control. The signal data collected by the sensors 110 may be transmitted to the analysis system 170 for processing. These signals or related signal data may be communicated in a continuous fashion or in one or more batches, at particular intervals according to various embodiments.

The analysis system 170 can receive and process signals from the sensors 110. Operation of the analysis system 170 may be supported by one or more analysis modules 175. The analysis system 170 may perform, among other functions, identification of user equipment devices 130, characterization of user equipment devices 130, localization of user equipment devices 130, and various other types of signal processing and analysis.

The console 180 and various associated operator interfaces can support configuring, controlling, or reviewing analysis results associated with the analysis system 170. The console 180 can provide visualization features for use by system or security administrators to monitor the electromagnetic environment for wireless security usage and security threats. Such visualizations may include displays about the area under observation including device type, device position, estimates of the data throughput being transmitted by devices, attack types being perpetrated, victim devices, and so forth. The operator interfaces may comprise interfaces associated with one or more visualization consoles 180, one or more administrative user interface application, or various other user or system interfaces associated with the technology presented herein.

The console 180 can provide a user interface for security personnel or system administrators to obtain visibility into operations of the analysis system 170 and determinations about the various user equipment devices 130 made from analysis of the electromagnetic environment. The analysis system 170 may localize, monitor, record, and playback the position and activity of the various user equipment devices 130 including suspected rogue, unauthorized, or malicious devices. A system administrator, or other user, may use the console 180 to discover, localize, and otherwise analyze a malicious user equipment devices 130 operating within an enterprise or other facility. The administrator may be provided with a visualization of the position of the user equipment devices 130 in the environment. The visualization may include metadata for each of the user equipment devices 130. For each given user equipment device 130, the metadata may include physical layer specifications such as modulation, protocols, symbol rates, bandwidths, or frequencies; a likelihood metric that the device is rogue, unauthorized, or malicious; a type of attack, if any, being employed by the device; and other user equipment devices 130 that the particular device is likely to be communicating with.

The networks 160 may interconnect some or all of the sensors 110, the analysis system 170, and the console 180. Portions of the networks 160 connecting the sensors 110 may be configured to transmit radio frequency signals and/or digital information. Radio frequency signals may be communicated as collected, down-converted using an intermediate frequency oscillator, or down-converted to baseband. Communication links associated with the networks 160 may use various physical media such as twisted pair, coaxial cable, or fiber optic cables. The signals transferred on the physical media may be analog RF, radio over fiber, digital, packetized, switched, connection-oriented, or any combination thereof. According to various embodiments, the communication links associated with the networks 160 may use wireless frequencies or transmission paths that are selected to avoid interference from or to the electromagnetic environment in use by the user equipment devices 130.

Figure 9:
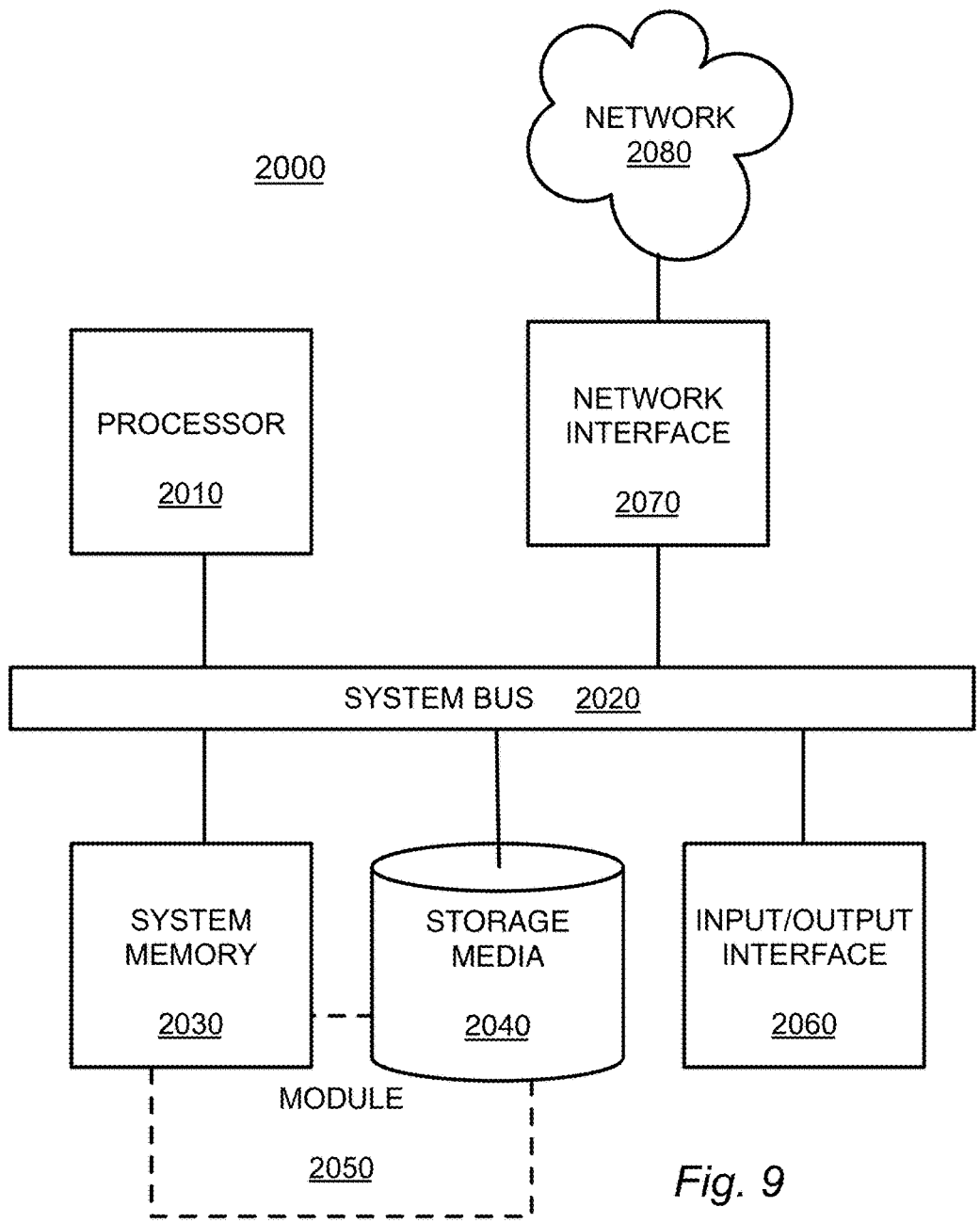
FIG. 9 is a block diagram depicting a computing machine and a module in accordance with one or more embodiments presented herein.

The user equipment devices 130, sensors 110, signal analysis system 170, console 180, or any other systems associated with the technology presented herein may be any type of computing machine such as, but not limited to, those discussed in more detail with respect to FIG. 9. Furthermore, any modules associated with any of these computing machines, such as the analysis module 175, or any other modules (scripts, web content, software, firmware, or hardware) associated with the technology presented herein may by any of the modules discussed in more detail with respect to FIG. 9. The devices and computing machines discussed herein may communicate with one another as well as other computer machines or communication systems over one or more networks such as network 160. The network 160 may include any type of data or communications links or network technology including any of the network technology discussed with respect to FIG. 9.

Figure 2:
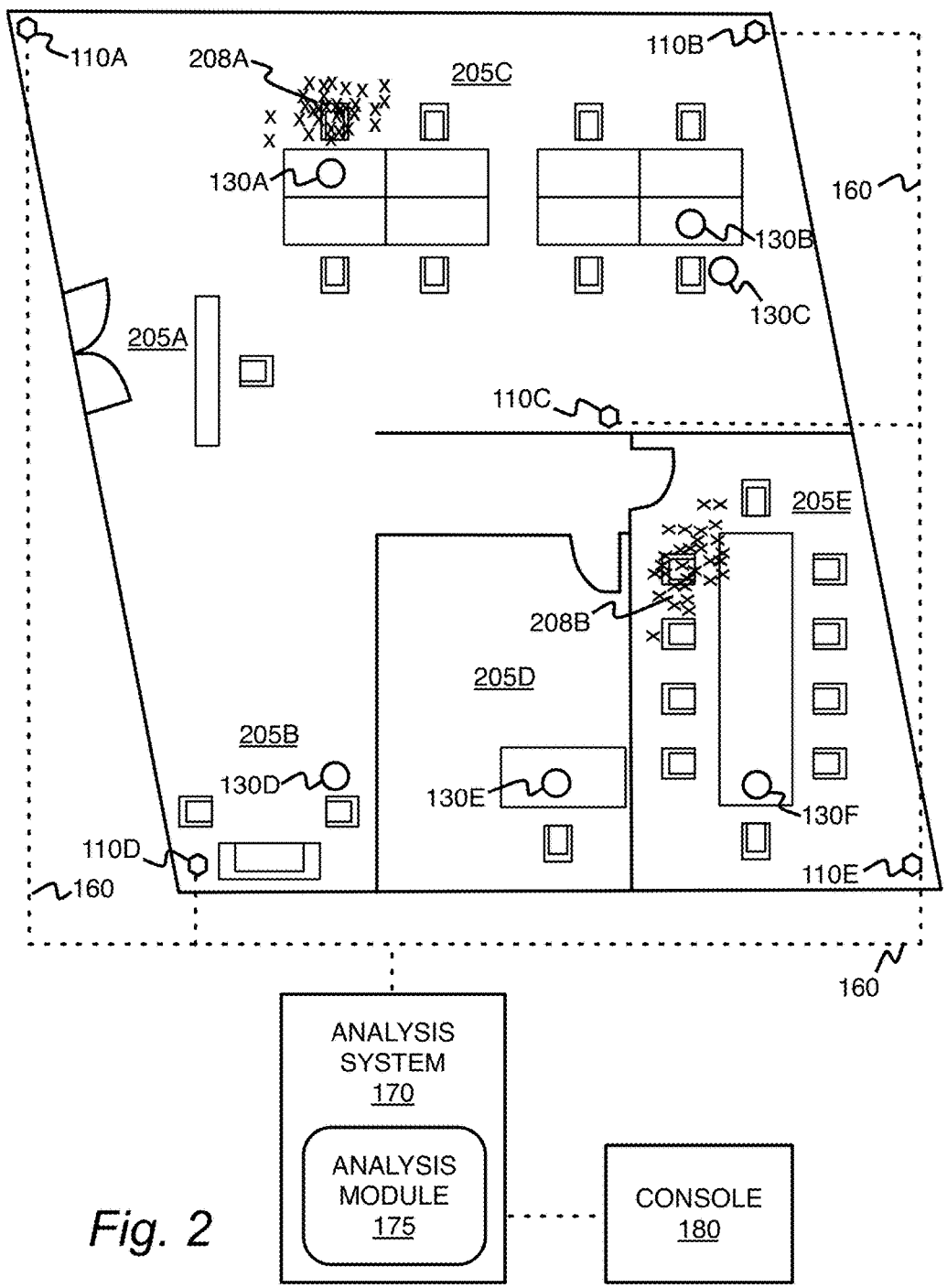
FIG. 2 is a block diagram depicting an operating environment for user equipment devices in accordance with one or more embodiments presented herein.

FIG. 2 is a block diagram depicting an operating environment for user equipment devices 130 in accordance with one or more embodiments presented herein. User equipment devices 130A-130F may each engage in one or more modes of radio communication thereby generating electromagnetic signals. The technology presented herein can collect and analyze these signals. Sensors 110A-110E positioned within collection areas 205A-205E can collect and report radio frequency signals within the surrounding electromagnetic environment. An analysis system 170 can process the collected radio frequency signals according to one or more analysis modules 175. Position estimates 208A-208B may be established, modeled, and tested to locate the user equipment devices 130A-130F within the electromagnetic environment. A console 180 can provide a user interface for configuring, controlling, or reviewing analysis results associated with the analysis system 170 and the associated radio frequency sensors 110. One or more networks 160 may interconnect some or all of the sensors 110, the analysis system 170, and the console 180.

The collection areas 205A-205E may be referred to, in general or collectively, as collection areas 205. Electromagnetic signals within the collection areas 205 may be sampled for processing and analysis as presented herein. Within the illustrated office environment, the collection area 205A is a reception area, the collection area 205B is a waiting area, the collection area 205C is an open working area, the collection area 205D is an office area, and the collection area 205E is a conference room area.

The sensors 110, or the antennas associated therewith, may be physically distributed around an area under observation. The collective coverage provided by the sensors 110 may define the effective extent of the area under observation. According to some examples, the sensors 110 may be positioned uniformly on a grid pattern throughout the area under observation. The grid may be a square grid, hexagonal grid, or other distributed pattern. The spatial period of the distribution pattern may be related to a coverage distance associated with each sensor 110. The periodic positioning of the sensors 110 may be altered to accommodate structures within the environment such as walls, stairwells, mechanical systems, and so forth. The periodic positioning of the sensors 110 may be altered to accommodate infrastructure feeds such as power and interface points for the network 160. For example, the interface points for the network 160 might be Ethernet ports.

Designing a location plan for the sensors 110 may start by receiving a floor plan of the proposed area under observation. Locations for available power and interface points for the network 160 may be identified. Sensor locations may be selected to form an approximately uniform grid, or other spatial distribution, constrained to the identified infrastructure locations. The sensors 110 may then be deployed at these locations. Once the sensors 110 are collecting signals, the number of frames, or other identified signal features, may be tracked such that sensors 110 collecting low numbers may be evaluated as potentially covering low traffic areas. Such low traffic sensors 110 may be repositioned or spaced out to improve aggregate reception efficiency. Designing a location plan for the sensors 110 in this fashion may be referred to as observation area survey planning.

The position estimates 208A-208B may be referred to, in general or collectively, as position estimates 208. The position estimates 208 may be established, modeled, and tested to locate the user equipment devices 130 within the electromagnetic environment. Determining the position, or relative positions, of user equipment devices 130, other entities, or associated signals may be referred to as geolocating, localization, positioning, geographical locating, and other similar terms. Localization over time can support modeling or estimation of motion including direction, velocities, accelerations, and other parameters.

Geolocating signals in an environment that is dense with other signals and contains complex propagation effects like multipath and Doppler shift can present several challenges. To aid in estimate the position of each signal, propagation modeling may leverage a database of sensor positions and various parameters associated with the propagation environment. The database may be populated through various possible calibration techniques. According to a particular example, the calibration may involve transmitting from user equipment devices 130 with known positions. Each sensor 110 can record the received power of each of the reference emissions from the user equipment devices 130 with known positions. From all of the known values, a parametric fit for the unknown propagation values may be performed. According to one example of this approach, the collected receiver power from the $i^{th}$ reference emitter received by the $r^{th}$ sensor 110 may be represented as:

$$P_{i,r} = a/d_{i,r}^n$$

where a and n are the unknown calibration parameters to be estimated and $d_{i,r}$ is the known distance between the $i^{th}$ reference emitter user equipment device 130 and the $r^{th}$ sensor 110. When the number of sensors 110 is given as R and the number of reference emitter user equipment devices 130 is given as I, then the calibration process results in R×I equations in two unknowns. Various optimization methods may be used to solve for the unknowns including, but not limited to, least-squares estimation, minimum-mean-square estimation, constrained optimization, and so forth.

Propagation modeling functionality may leverage the calibration parameters, signal power and angle values, and a coordinate system of locations for the sensors 110 to calculate a forward model of the expected power and angle values for sample points in space. According to particular embodiments, the model values may be used to create an initial geolocation estimate using multilateration techniques. The initial geolocation estimate may be used to seed a model-matching filter. The model-matching filter can evaluate multiple aggregated feature vectors in series. For each aggregate feature vector, the model-matching filter may initialize an ensemble of hypothesized signal source positions around the initial seed position. In an iterative process using the model values, a tighter estimate of the aggregate feature vector position may be generated for the user equipment device 130 being located. As part of each iteration, hypothesized positions that do not fit the model may be removed. After a sufficient number of iterations, the position estimate for the aggregate feature vector may converge to a single point. This approach may be repeated for all aggregate feature vectors.

Model localization may use a similar technique of hypothesized positions, however the hypothesis set may also include a range of time steps. Multiple iterations of hypothesized trajectories (or tracks) may be examined where prior information about the likelihood of each trajectory may be considered in the model. By filtering out unlikely tracks, a track may be converged that best fits the data. For example, it is likely that a mobile device will be traveling at 2 m/s, but it is unlikely that it will be traveling at 200 m/s. Accordingly, a track indicating an aggregate feature vector from a mobile device traveling at 200 m/s may be filtered out of the model.

Figure 3:
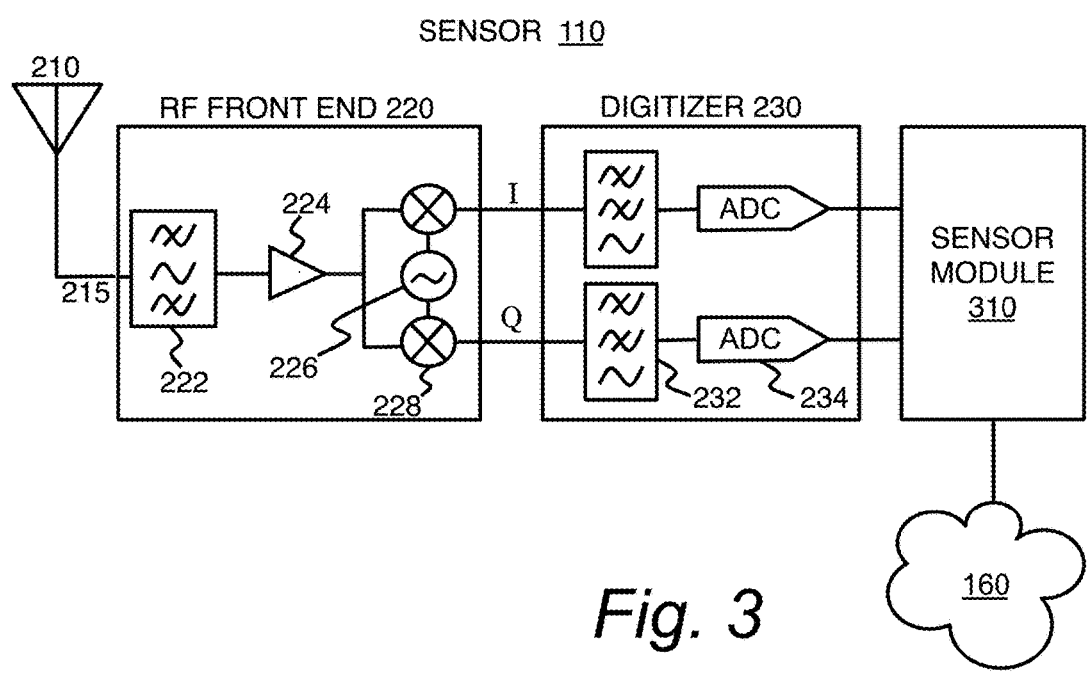
FIG. 3 is a block diagram depicting a sensor incorporating a software-defined radio receiver in accordance with one or more embodiments presented herein.

FIG. 3 is a block diagram depicting a sensor 110 incorporating a software-defined radio receiver in accordance with one or more embodiments presented herein. An antenna 210 may receive a radio frequency signal 215. The radio frequency signal 215 may be coupled into a radio frequency front end 220. The radio frequency front end 220 may condition the radio frequency signal 215 to generate an analog output signal. The analog output signal may comprise in-phase and quadrature components referred to as I and Q signals. The analog output from the radio frequency front end 220 may be coupled to a digitizer 230. The digitizer can output data that is a digital representation of the analog output generated by the radio frequency front end 220. The digital representation may be sampled in time and quantized in amplitude. The digital representation may also comprise separate I data and Q data. A sensor module 310 may receive and process the raw digital representation generated by the digitizer 230. Results of processing associated with the sensor module 310 may be communicated onto the network 160 for further processing.

The antenna 210 may be implemented as multiple antennas 210. The one or more antennas 210 may be used to collect a broad range of radio frequency signals from the electromagnetic environment for analysis. The antennas 210 may use various antenna geometries. According to certain examples, the antennas 210 may be monopoles, dipoles, patch antennas, yagis, parabolic, horns, loops, reflector antennas, beam antennas, or any other type of structure configured to become electrically excited by radio frequency electromagnetic radiation of a desired frequency, polarization, or propagation direction. The antennas 210 can be located in various locations around a room, around a building, or within different areas or floors of a building. The antennas 210 may also be located in multiple buildings making up a campus, enterprise, outdoor facility, arena, parking lot, airport, land area, and so forth.

According to certain example embodiments of the radio frequency front end 220, a radio-frequency band-pass filter 222 can select a channel, or a frequency range, from the radio frequency signal 215. A low noise amplifier 224 may be used to increase the amplitude of the signal from the selected channel. A signal from a variable-frequency oscillator 226 may be combined, or mixed, with the radio frequency signal by a mixer 228. Mixing the radio frequency signal with both the signal from a variable-frequency oscillator 226 and an out-of-phase copy of the oscillator output may be used to generate both in-phase and quadrature (I and Q) components. The frequency of the variable-frequency oscillator 226 may be tuned to down-convert the radio frequency signal to a lower frequency such as baseband, an intermediate frequency, or some other local oscillator frequency.

According to certain example embodiments of the digitizer 230, a low-pass filter 232 may be applied to the I and the Q signals from the radio frequency front end 220. The low-pass filter 232 may be useful as an anti-aliasing filter before digitizing the signal. An analog to digital converter (ADC) 234 can convert the continuous, analog signal into a digital value that represents a time sampling of an amplitude associated with the continuous signal. The sampling may be quantized in amplitude and may be periodic in time. The mathematical inverse of this sampling period may be referred to as the sampling frequency. The output of the ADC 234 may be a sampled sequence of digital values that have been converted from a continuous-amplitude and continuous-time analog signal to a discrete-amplitude and discrete-time digital signal. According to certain embodiments, both I and Q signal components may be separately filtered and converted. Accordingly, there may be two separate low-pass filters 232 and two separate analog-to-digital converters 234.

The sensor module 310 may be implemented in software, firmware, programmable logic, or other such flexible technology. Accordingly, the sensor module 310 may be considered as (all, or part of) the software portion of the software-defined radio receiver. The sensor module 310 can process a digital representation of the raw collected radio frequency signal 215. The sensor module 310 may receive digital I and Q signal samples from the digitizer 230.

It should be appreciated that aspects of the receiver presented herein may be programmable, adjustable, or otherwise controllable. In addition to the software (or otherwise flexible) portion of the receiver, agility and configurability may be supported by elements of the radio frequency front end 220 and the digitizer 230 that are programmable, adjustable, or otherwise controllable. Parameters associated with these elements may include a pass-band of the band-pass filter 222, a gain of the low noise amplifier 224, a frequency of the oscillator 226, a cut-off response of the low-pass filter 232, a sampling rate of the ADC 234, and so forth.

It should be appreciated that while certain example sensors 110 presented herein may be software-defined radios, other example sensors 110 may be hardware-defined radios or simply hardware radios. Generally, a hardware radio is fixed to operate on predefined frequencies, bandwidths, modulation techniques, coding, protocols, and wireless communications standards. In contrast, a software-defined radio may be reconfigurable using software to handle any number of different communication standards even custom or otherwise non-standards-driven wireless communications. It should be appreciated that a hardware radio is often highly integrated, specifically designed for its single purpose, and thus considerably less costly to implement than a software-defined radio. Accordingly, it may be said that there is a tradeoff between cost and flexibility when comparing hardware radios and software-defined radios. Software-defined radios are generally much more flexible but considerably more costly while hardware radios are generally less flexible but also less costly.

The sensor module 310 may be any type of computing machine such as, but not limited to, those discussed in more detail with respect to FIG. 9. Furthermore, the sensor module 310, any modules associated therewith, or any other modules (scripts, web content, software, firmware, or hardware) associated with the technology presented herein may by any of the modules discussed in more detail with respect to FIG. 9. The devices and computing machines discussed herein may communicate with one another as well as other computer machines or communication systems over one or more networks such as network 160. The network 160 may include any type of data or communications links or network technology including any of the network technology discussed with respect to FIG. 9.

Figure 4:
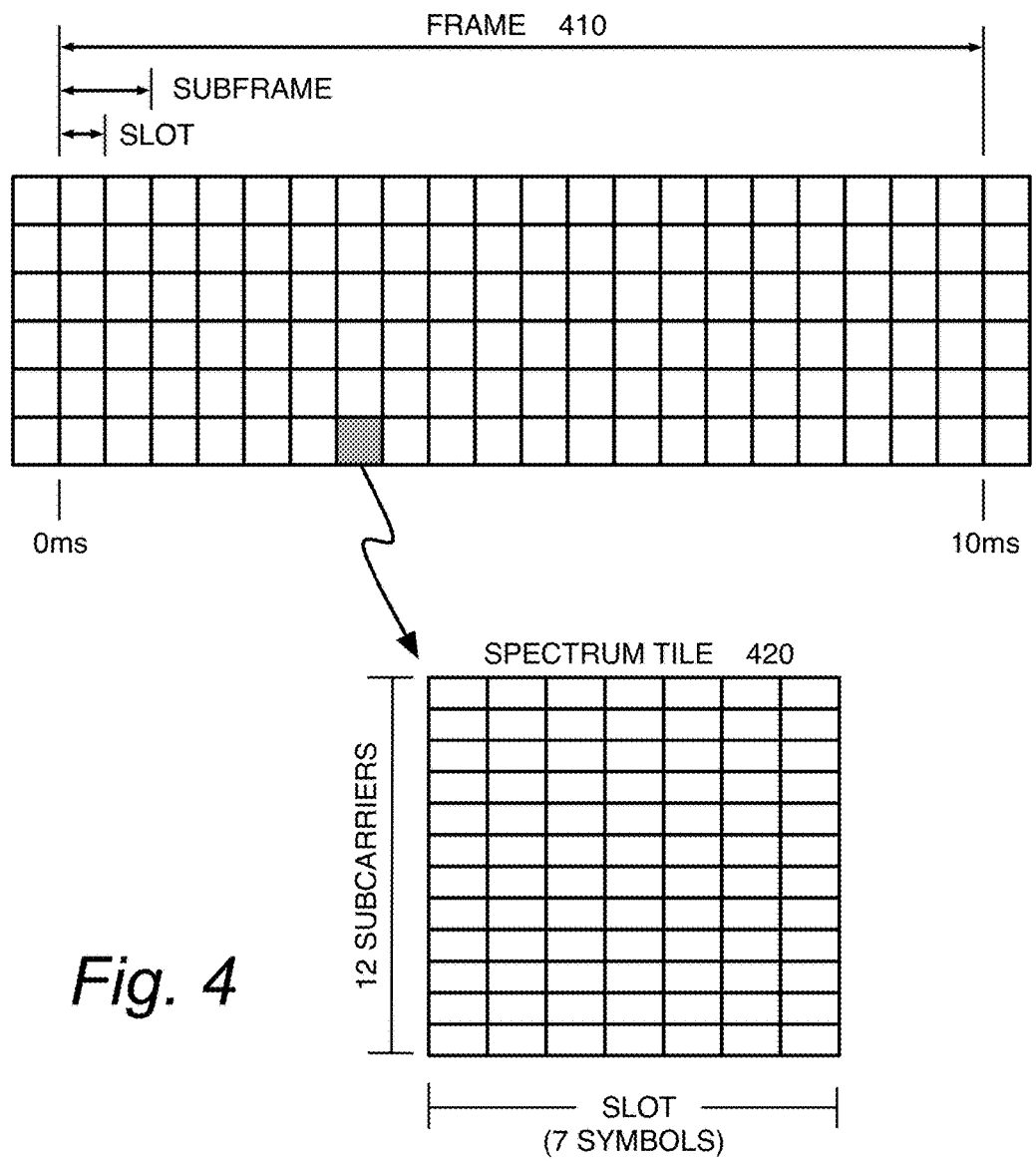
FIG. 4 is a signal diagram depicting a communication frame and spectrum tile in accordance with one or more embodiments presented herein.

FIG. 4 is a signal diagram depicting a communication frame 410 and spectrum tile 420 in accordance with one or more embodiments presented herein. High-speed, mobile wireless communication systems, such as LTE, may employ Orthogonal Frequency Division Multiplexing (OFDM) in the radio downlink 150. OFDM, or a pre-coded version of OFDM referred to as Single Carrier Frequency Division Multiple Access (SC-FDMA), may be employed in the radio uplink 140. OFDM is a frequency-division multiplexing (FDM) scheme using numerous narrow sub-carriers for multi-carriers to encode data.

Technologies presented herein may be applied to various types of high-speed, mobile wireless communication systems. Specific examples are drawn to LTE without limiting the scope or spirit to only LTE or any other particular high-speed, mobile wireless communication paradigm.

Generally, a frame 410 may be subdivided into minimum allocation units or spectrum tiles 420. Each spectrum tile 420 may comprise a certain number of subcarriers each encoding a given number of symbols.

For example, an LTE frame 410 may be 10 ms in duration. The frame 410 may comprise 20 slots of 0.5 ms duration. Each slot may encode seven symbols. In LTE, the spectrum tile 420 may be referred to as a resource block, which is the smallest allocation unit of resources in LTE. Each spectrum tile 420 (or resource block in LTE) may be one slot (0.5 ms) in duration and may encode seven symbols in each of twelve 12 subcarriers. Each subcarrier may occupy 15 kHz of bandwidth.

It should be appreciated that this, or any other, partitioning of time and frequency resources may be used to specify the frame 410 and spectrum tile 420 for encoding with any particular high-speed, mobile wireless communication system embodiment.

Example Processes

According to methods and blocks described in the embodiments presented herein, and, in alternative embodiments, certain blocks can be performed in a different order, in parallel with one another, omitted entirely, and/or combined between different example methods, and/or certain additional blocks can be performed, without departing from the scope and spirit of the invention. Accordingly, such alternative embodiments are included in the invention described herein.

Figure 5:
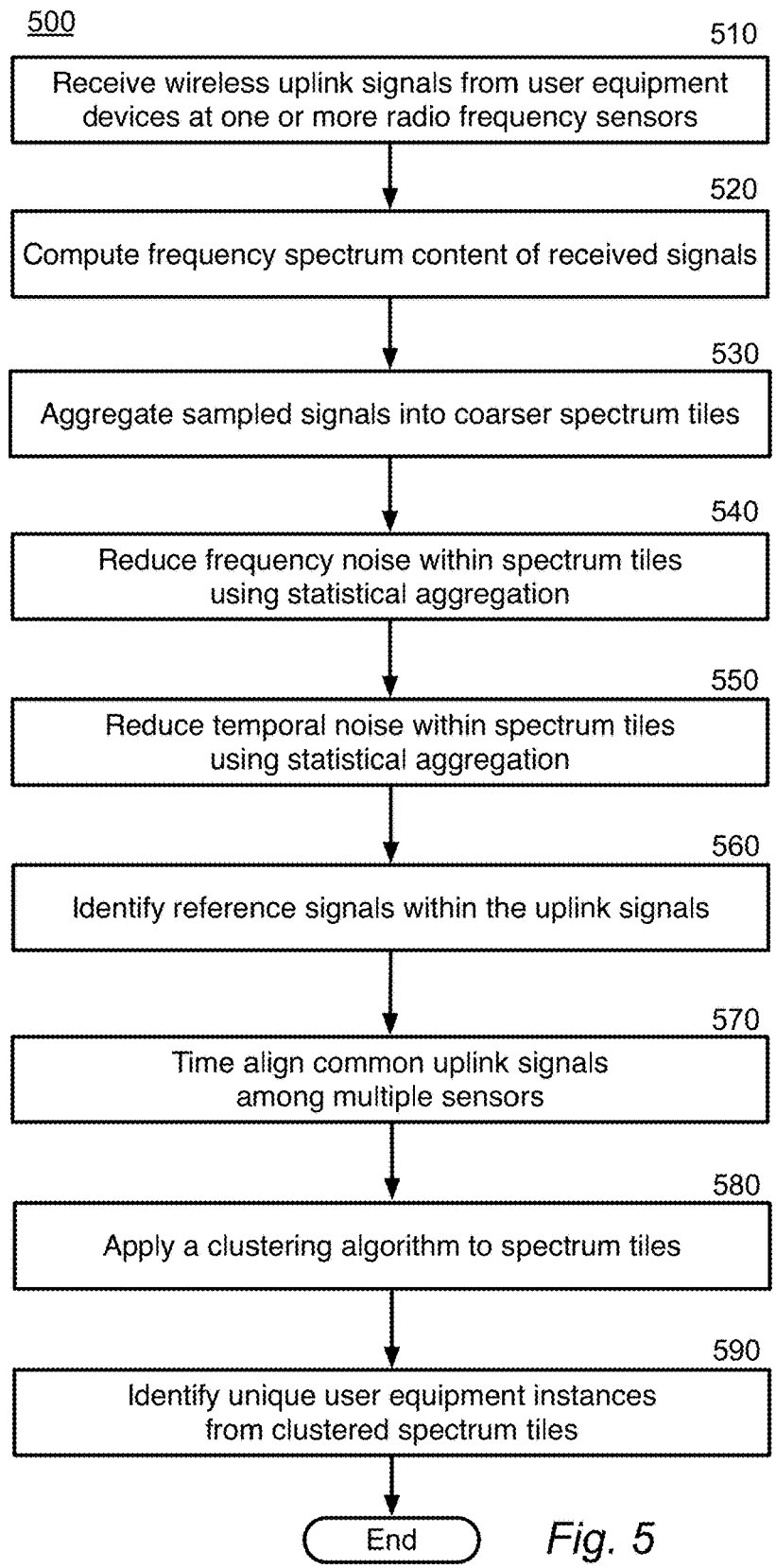
FIG. 5 is a block flow diagram depicting a method for user equipment identification from mobile, high-speed wireless uplink channels in accordance with one or more embodiments presented herein.

FIG. 5 is a block flow diagram depicting a method 500 for user equipment identification from mobile, high-speed wireless uplink channels in accordance with one or more embodiments presented herein. In block 510, one or more radio frequency sensors 110 may collect signals from radio uplinks 140 of user equipment devices 130 to base stations 120. While the techniques presented herein may be applied to signals collected by one radio frequency sensor 110, multiple spatially distributed sensors 110 can improve results.

In block 520, frequency spectrum content of the collected uplink signals may be computed. This processing may be performed at the sensor module 310, or in some embodiments at the analysis system 170. The processing may comprise Fourier transform computations, such as applying the Fast Fourier transform (FFT), or other such frequency domain transformations. For example, LTE uses a 2048-point FFT grid to distribute subcarriers. Various other values or sample spacing patterns may be used without departing from the spirit or scope of the technology presented here.

In block 530, the sampled signals may be aggregated into coarser spectrum tiles 420. In the case of the LTE resource block, this aggregation provides a reduction factor of 7×12 or 84. Such aggregation can result in a significant reduction in the number of samples to process. Aggregation can also average out noise or measurement aberrations that occur on the subcarrier level over the spectrum tile or resource block. The spectrum tiles or resource blocks may be the smallest unit of spectrum resource that is contiguously allocated to a user. Accordingly, that level of coarse aggregation can be done blindly on a uplink signal while reducing the likelihood of smearing the energy between two users.

In block 540, statistical aggregation may be used to reduce frequency noise within spectrum tiles 420. Using a blind, or unsupervised, aggregation process may result in operating on spectrum tiles 420 that may, or may not be, aligned to the actual transmitted frame boundaries. Noise reduction based on statistical aggregation can mitigate alignment uncertainty associated with the frame 410 or spectrum tile 420. Statistical aggregation techniques may include application of rank statistics, application of thresholds, averaging, shaping, normalizing, weighting, and so forth.

As an example of applying rank statistics, consider a spectrum tile composed of 7 symbols in time and 12 subcarriers in frequency. For the 12 subcarriers in each time bin, the subcarriers may be sorted and then the second smallest value may be used as the aggregated value. Similar to taking the median, where the 50th percentile is used, in this example, the 20th percentile value may be used. This approach can mitigate high-power frequency spurs that may only span a few subcarriers. Such spurs may be common in software defined radio measurement devices. Their mitigation can improve the accuracy of signal strength readings. For example, using the second smallest subcarrier power value can mitigate interference spurs in the nine larger subcarrier values.

In block 550, statistical aggregation may be used to reduce temporal noise within spectrum tiles 420. Noise reduction based on statistical aggregation can mitigate alignment uncertainty associated with the frame 410 or spectrum tile 420. Statistical aggregation techniques may include application of rank statistics, application of thresholds, averaging, shaping, normalizing, weighting, and so forth.

As an example of applying rank statistics, consider a spectrum tile composed of 7 symbols in time and 12 subcarriers in frequency. For the 7 time bins in each subcarrier, the temporal values may be sorted. Then, the second largest value may be used as the aggregated value. From the example in the previous step using the second-smallest value in the frequency dimension, using the second largest value in the time domain can serve to mitigate an underestimation bias on the signal strength estimate. Other ranking values or thresholds may be applied as well, both in time and in frequency.

In block 560, reference signals may be identified within the uplink signals. A correlation filer bank may be used to identify spectrum tiles 420 associated with sounding reference signals (SRS). The bank may include all possible SRS values. Subsequent processing can focus on these SRS spectrum tiles. The filter bank can represent all possible sounding reference signals. The SRS signals may be unique to a specific user equipment device. A correlation hit against one of the SRS bank entries can immediately associate to particular user equipment device. The magnitude of the correlation hit may be proportional to the signal strength value. This correlation may have less variance than a non-coherent signal strength reading from a resource block. Thus, finding an SRS correlation may obviate aggregation-based noise mitigation for signal strength estimates of the spectrum tiles or resource blocks.

In block 570, common radio uplink 149 signals may be time-aligned among multiple sensors 110. Signal processing may compute pairwise correlation of signals from each sensor 110. The correlation outputs reconciled to time align readings across all sensors 110.

In block 580, a clustering algorithm may be applied to the aggregated spectrum tiles 420. A singular value may be used from each spectrum tile 420 (or LTE resource block) to perform blind clustering. The clustering may be performed by density-based spatial clustering of applications with noise (DBSCAN) or by some other data clustering algorithm.

Spectrum tiles 420 may be clustered according to signal strength (RSSI) levels. Other clustering parameters may be used instead of, or in addition to, signal strength. Among other examples, these clustering parameters may include estimated timing, frequency offset, channel delay spread estimates, or spatial reception patterns across antenna arrays.

In block 590, unique user equipment instances may be identified from clustered spectrum tiles. The number of clusters may be evaluated as an indication of the number of user equipment devices 130 that are operating with the evaluation area. These results may be communicated to the console 180 and/or used for further processing, such as localization of the identified user equipment devices 130.

Figure 6:
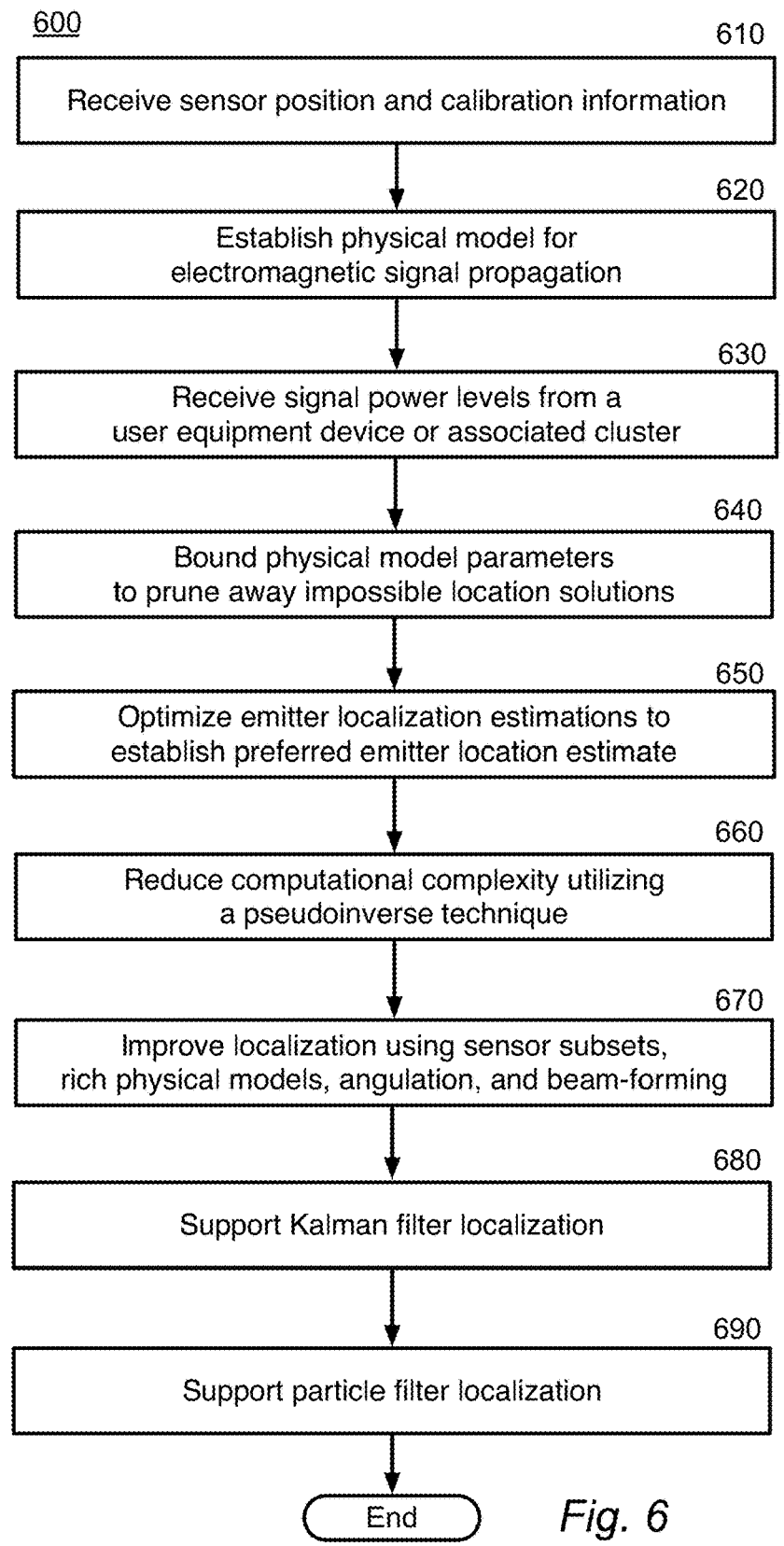
FIG. 6 is a block flow diagram depicting a method for localization of mobile high-speed wireless user equipment from uplink channels in accordance with one or more embodiments presented herein.

FIG. 6 is a block flow diagram depicting a method 600 for localization of mobile high-speed wireless user equipment from uplink channels in accordance with one or more embodiments presented herein. In block 610, information for sensor position and calibration can be received. The information can include sensor position data, electromagnetic environment calibration data, and any other information required to perform localization analysis. Locating user equipment devices 130 within an environment dense with other signals and complex propagation effects like multipath and Doppler shift can present several challenges. To aid in estimating the position of each user equipment device 130, electromagnetic propagation modeling can leverage known values such as sensor positions and various parameters associated with the propagation environment. According to a particular example, calibration may involve transmitting from user equipment devices 130 with known positions. In addition to locating user equipment devices 130, these techniques can determine the presence of user equipment devices 130 as well as aid in computer the quantity of user equipment devices 130.

In block 620, a physical model may be established for electromagnetic signal propagation within the electromagnetic environment. According to one example of this approach, the collected receiver power $P_r$ at a sensor 110 from transmitted power $P_t$ from a user equipment device 130 may be modeled as:

$$P_r = P_t a d^n$$

where a and n are the unknown calibration parameters to be estimated and d is the distance between the user equipment device 130 and the sensor 110. In free space, $$a=(4\pi f/c)^{-2} \text{ and } n=-2$$

In typical use environments, these values vary. Taking the logarithm of the received power expression gives:

$$\text{RSSI} = p + n \log(d)$$

where RSSI (received signal strength indicator) may be given in dB. Note that this expression is linear in the two unknowns n and p. When the number of sensors 110 is given as R and the number of observations from a user equipment device 130 is given as k, then the model provides for R×k equations in two unknowns.

In block 630, signal power levels for a user equipment device 130, or associated cluster, may be received from the spectrum tile clustering process. Localization may be carried out as an estimation problem. The distance between each sensor 110 and each user equipment device 130 may be estimated from the received signal strength. Multiple instances of such distances can support estimation of likely positions for each user equipment device 130.

According to certain embodiments, accurate signal power levels may be obtained from filtered control channel processing. Control channel allocations generally have a fixed bandwidth and therefore the control channel signal power levels can be measured in the time domain with reduced bandwidth ambiguity.

Physical model parameters may be estimated at test locations within the electromagnetic environment. According to certain embodiments, the test locations may be spaced on a grid covering an entire area. Using such a spatial sampling grid can support performing a grid search of test locations over an entire area. Alternatively, particular points may be tested. For example, common seated areas or open central areas may be likely location solutions. For each point, estimates may be computed for the unknown parameters n and p. Also, an error measure may be computed between the model and observed data.

Initial seed location estimates can be calculated based upon electromagnetic propagation models. These calculations can leverage the received calibration data. Estimated or computed signal power and angle values associated with each user equipment device 130 may also be incorporated into the initial seed location estimates. An absolute coordinate system of the sensor locations may be used to calculate a forward model of the expected power and angle values for points in space within the electromagnetic environment. The model values may be used to create an initial localization estimate using multilateration techniques as a seed process.

Model errors may be computed for the test locations. These model errors may be a measure of variation between the model and observed data for each test point. The model errors over a given area may be visualized as a heat map where areas of minimal error are of particular interest as likely localization solutions. When multiple such solutions appear to be emerging, some solutions may be removed or pruned.

In block 640, impossible location solutions may be pruned away by establishing bounds on the physical model parameters. For example, the physical parameters n and p may be limited to only values that are physically possible or meaningful. For example, positions providing values for n that are less than ten (and especially those of incorrect sign or slope entirely) may be removed from the solution pool. According to certain embodiments, propagation parameters may be constrained to improve location accuracy through the use of constrained least squares optimization.

In block 650, emitter localization estimations may be optimized. Such optimization may seek to select the "best" location solution as the final location. Which location is the "best" may be selected based upon having the least error. Various optimization methods may be used to solve for the unknowns including, but not limited to, least-squares estimation, minimum-mean-square estimation, constrained optimization, and so forth.

An example localization algorithm can find x and y locations by weighting positions of the sensors 110 by measured signal power level values. The weights may be transformed in order to accentuate high signal power levels and deemphasize low signal power levels.

One or more preferred emitter location estimates may be established within the electromagnetic environment. Establishing preferred emitter location estimates can locate a user equipment device 130 as being in a particular location at a particular time merely from its radio uplink 140 emissions.

In block 660, computational complexity of parameter estimation can be reduced utilizing a pseudoinverse matrix technique. For example, a set of RSSI expressions such as $$RSSI = p + n \log(d)$$

may be collectively expressed as $$\begin{bmatrix} rssi_{1,1} \\ rssi_{1,2} \\ rssi_{1,3} \\ \vdots \\ rssi_{2,1} \\ rssi_{2,2} \\ \vdots \\ rssi_{L,1} \\ rssi_{L,2} \\ \vdots \\ rssi_{L,K_L} \end{bmatrix} = \begin{bmatrix} 1 & \log(d_{1,1}) \\ 1 & \log(d_{1,2}) \\ 1 & \log(d_{1,3}) \\ \vdots & \vdots \\ 1 & \log(d_{2,1}) \\ 1 & \log(d_{1,2}) \\ \vdots & \vdots \\ 1 & \log(d_{L,1}) \\ 1 & \log(d_{L,2}) \\ \vdots & \vdots \\ 1 & \log(d_{L,K_L}) \end{bmatrix} \begin{bmatrix} p \\ n \end{bmatrix}$$

or r=Xy where r is a vector of RSSI values, X is a two column matrix and y is a vector of the physical parameters n and p to be estimated. Determining y may be accomplished by computing an estimate of y as $X^\dagger r$ where is $X^\dagger$ a pseudoinverse of X.

In block 670, localization can be improved using subsets of the radio frequency sensors 110. The physical model parameters n and p may not be the same for each sensor 110. The propagation environment is likely not homogenous throughout with path losses that looks the same from all sensors 110. For example, there may be walls, conductive objects, shadows, attenuation, reflections, multipath, radio interference, and so forth. An effective mitigation approach is to run the model computations over multiple subsets of the sensors 110 to obtain various solutions for the physical parameters. Outlier parameters may then be thrown out to obtain preferred parameters for use within the models.

Localization can be improved using rich physical models of the environment that may incorporate and account for walls, obstructions, conductive objects, shadows, attenuation, reflections, multipath, radio interference, or other such factors.

Localization can be improved using angulation and beamforming. Location estimation may also comprise determining a directional (or angular) orientation for a user equipment device 130. Various phase combinations of the antennas 210 may be used in order to discriminate the source of an emission by an angle relative to the antennas 210. For example, a complex-valued sample may be taken from the frequency-domain data vectors of each of L antennas 210. A vector z may be formed of these samples. A linear combination of the elements of z may be defined by multiplying by a point vector w(a) that is a function of the angle of interest, a. The resulting vector product w(a) z is a scalar value that indicates the intensity of the time-frequency energy in the angle direction a. According to particular embodiments, by sweeping through a range of angles, signal strength values may be located within tighter physical bounds. These bounds may provide additional information to the localization models.

In block 680, Kalman filtering can support localization. The Kalman filter may be considered a sophisticated moving average in time. Modeled motion tracks may be evaluated to further refine test locations. Model tracking may leverage a similar process of hypothesized test positions, except that the hypothesized test set includes a range of time steps. Multiple iterations of hypothesized trajectories (or tracks) may be examined where prior information about the likelihood of each trajectory is also considered in the model. By filtering out unlikely tracks, the system may converge on the track that best fits the data and uses that track as the estimated track. For example, it is likely that a mobile device will be traveling at 2 m/s, but it is unlikely that it will be traveling at 200 m/s. Accordingly, a track (or trajectory) indicating an aggregate feature vector from a mobile device traveling at 200 m/s may be filtered out of the model.

The Kalman filter may use two main parameters to control the behavior, the assumed variance of velocity for each user equipment device 130, and the assumed variance of the (x,y) input estimates. Setting the measurement variance as low can cause the filter to process the measurements as generally correct. Accordingly, outputs look similar to the inputs. Setting the velocity variance as low can cause the filter to process as though spatial hops are unlikely. Accordingly, the outputs are smoothed to avoid the hops.

In block 690, particle filtering can improve localization. The particle filter localization technique can process non-linearities more robustly than that Kalman filter. The Kalman filter assumes that the state as Gaussian whereas the particle filter may be bimodal, for example.

Figure 7:
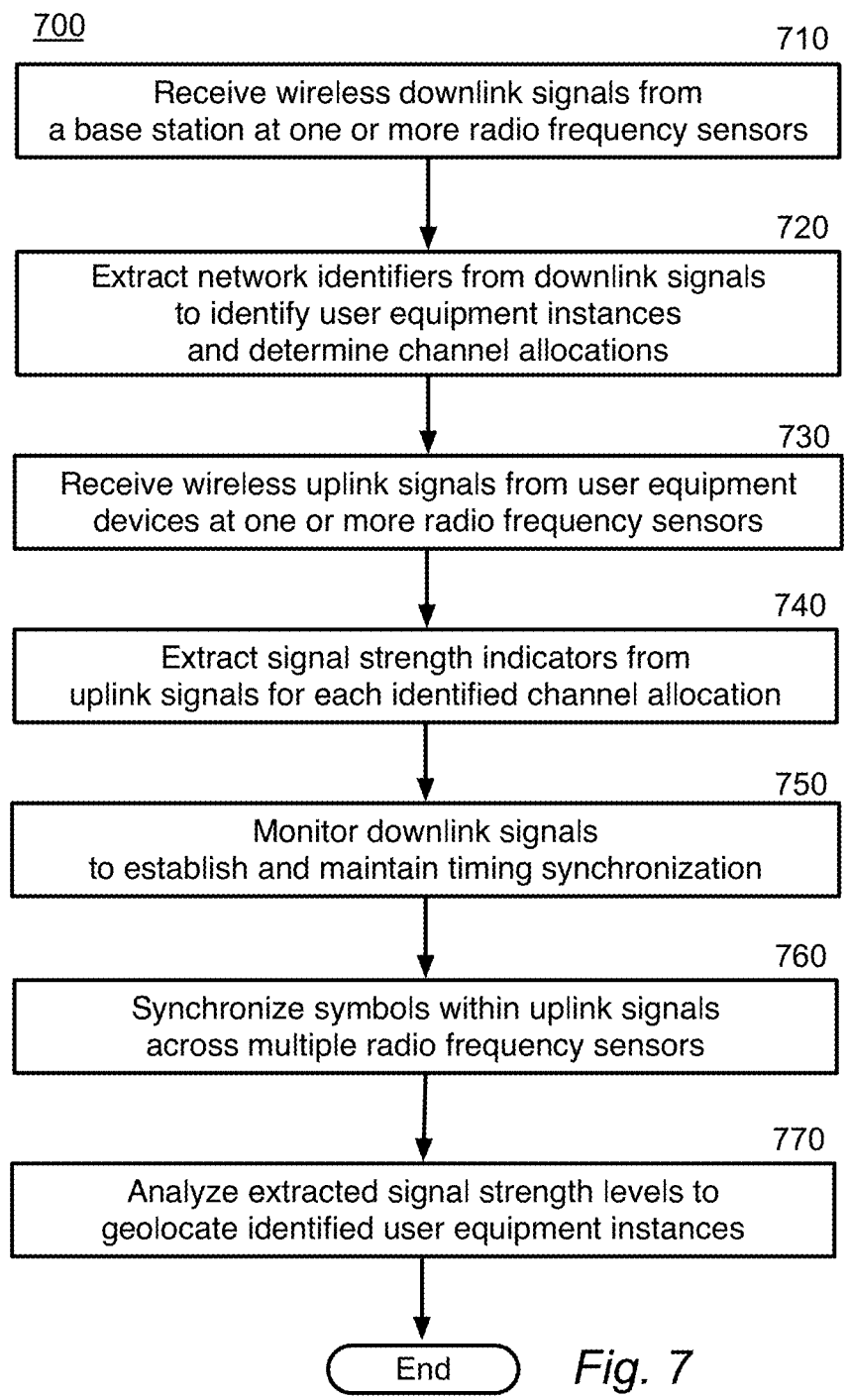
FIG. 7 is a block flow diagram depicting a method for localization of mobile high-speed wireless user equipment from downlink channels in accordance with one or more embodiments presented herein.

FIG. 7 is a block flow diagram depicting a method 700 for localization of mobile high-speed wireless user equipment from downlink channels in accordance with one or more embodiments presented herein. In block 710, wireless downlink signals 150 from a base station 120 can be received into one or more radio frequency sensors 110. While the techniques presented herein may be applied to signals collected by one radio frequency sensor 110, multiple spatially distributed sensors 110 can improve results.

In block 720, network identifiers can be extracted from downlink signals 150 to identify user equipment instances 130 and determine channel allocations. The downlink signal 150 can include lists of network identifiers and their corresponding channel allocations. Example network identifiers, according to certain embodiments, may include Radio Network Temporary Identifiers (RNTI).

Information blocks within the downlink signal 150, such as the master information block (MIB) or the system information block (SIB) can provide mappings between the network identifiers and respective spectrum tiles 420. The mappings may be used to identify clusters of spectrum tiles 420 corresponding to particular user equipment instances 130. The approach of matching network identifiers may be leveraged without relying upon blind clustering techniques.

The information extracted from the downlink signals 150 may be used to enumerate, quantify, identify, or localize the user equipment devices 130 in operation.

In block 730, wireless uplink signals 140 from user equipment devices 130 may be received into one or more radio frequency sensors 110. According to certain embodiments, multiple radio frequency sensors 110 may be monitoring the uplink signals 140 while one (or some other subset) of particular radio frequency sensors 110 can be dedicated to monitoring the downlink signals 150. According to certain embodiments, the radio frequency sensors 110, or subsets thereof, may switch between monitoring uplink signals 140 and downlink signals 150 in a time-divided fashion.

In block 740, signal strength indicators may be extracted from the uplink signals 140 for each identified channel allocation. Signal strength indicators, such as the received signal strength indication (RSSI), can be extracted from the uplink signals 140. One or more signal strength indicator may be provided for each network identifier or identified channel allocation.

In block 750, the downlink signals 150 can be monitored to establish and maintain timing synchronization. Radio frequency sensors 110 monitoring uplink signals 140 can periodically switch to monitoring downlink signals 150 for timing synchronization. A synchronization signal, such as a primary synchronization sequence (PSS), may be identified within the downlink signal 150. These synchronization signals may be used to cue periodic time synchronization.

Synchronization signals, such as the PSS, may be symbol-aligned to frame or sub-frame boundaries within certain spectrum tiles 420. Such symbol alignment may be leveraged to obtain the boundaries of spectrum tiles 420. Correlation peaks with a synchronization signals, such as the PSS, may be used to denote the start of a frame or sub-frame boundary. From these boundaries, spectrum tiles 420 may be data-reduced without added noise due to overlapping between spectrum tiles 420. A statistical aggregation approach may also be applied here to filter out noise.

In block 760, symbols within uplink signals 140 may be synchronized across multiple sensors 110. Uplink symbols can be aligned to frame or sub-frame boundaries across multiple sensors 110. Each sensor can support synchronizing to a sub-frame boundary. Correlation to downlink synchronization signals, such as the PSS, may be used to denote the start of a frame or sub-frame boundary. Timing can be tracked as a radio frequency sensor 110 tunes from the downlink 150 back to the uplink 150. Accordingly, multiple, or all, radio frequency sensors 110 may synchronize to detected symbols in the uplink on frame or sub-frame boundaries.

Symbols within the uplink signals 149 can be synchronized across multiple sensors 110. System frame numbers or identifiers, for example from the MIB, may be identified within the downlink signals 150. The system frame numbers or identifiers may be used as a time index by multiple, or all, radio frequency sensors 110.

A host-based timing protocol may be leveraged to time-align readings across multiple, or all, radio frequency sensors 110. Precision time protocol (PTP) or other host-based timing protocols may be used.

In block 770, extracted signal strength levels may be analyzed to geolocate identified user equipment instances 130.

Figure 8:
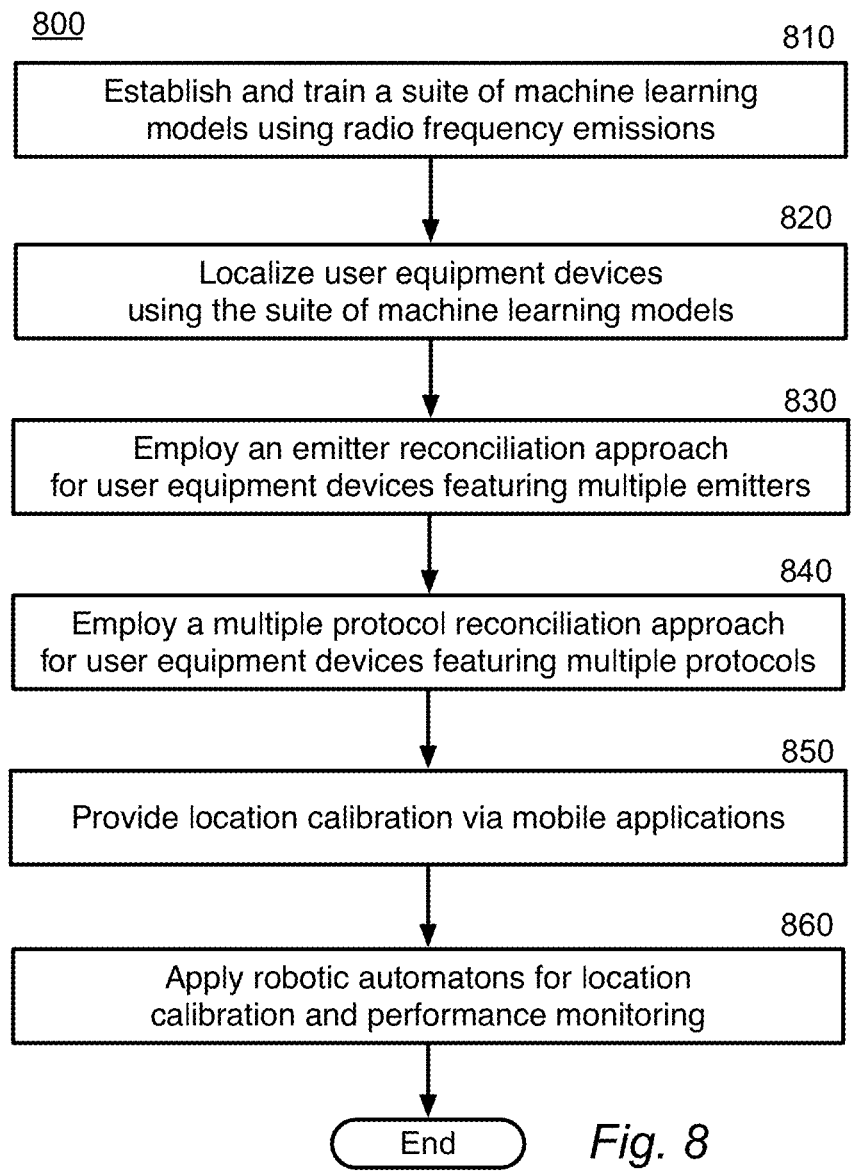
FIG. 8 is a block flow diagram depicting a method for localization calibration and refinement in high-speed mobile wireless systems in accordance with one or more embodiments presented herein.

FIG. 8 is a block flow diagram depicting a method 800 for localization calibration and refinement in high-speed mobile wireless systems in accordance with one or more embodiments presented herein. In block 810, a suite of machine learning models can be established and trained using radio frequency emissions. The machine learning models can be trained using collected, or processed, data from the uplink signals 140 and/or the downlink signals 150. After training, the machine learning models may be exercised to predict outcomes and performance for localization.

In block 820, user equipment devices 130 can be localized using the suite of machine learning models. Signal strengths may be provided as inputs to the machine learning models and the models can be trained to provide outputs in the form of the emitter locations. The machine learning models may comprise one or more regression models.

According to certain embodiments, the input to a model may be feature vectors including signal strengths from multiple sensors. The output of the model may estimate the physical coordinates of the emission.

Examples for training a random forest or a deep neural network may apply sets of feature vectors and actual physical locations to the model. Examples for training gradient descent back propagation may force the model to predict the correct position coordinates from the input features.

Once a model is trained, it can be used in a prediction phase. Signal strength feature vectors with unknown positions can be fed into the model. The model will output estimated emission positions. The quality of the model may be improved through the application of additional training examples during the training phase. The quality of the model may be improved through the application of more diverse training examples during the training phase.

In block 830, an emitter reconciliation approach may be employed for identified user equipment devices 130 featuring multiple-emitters. For example, if a user equipment device 130 includes both Wi-Fi and LTE radio frequency emitters, information, such as identification or location, from one of those radio frequency emitters may be used to calibrate or refine models associated with the other radio frequency emitter. While this example includes two radio frequency emitters, multiple radio frequency emitters may be leveraged.

In block 840, a multiple protocol reconciliation approach may be employed for identified user equipment devices 130 featuring multiple protocols. For example, if a user equipment device 130 executes both Wi-Fi and an LTE protocol operations. Knowledge, such as identification or location, from one of those protocols may be used to calibrate or refine models associated with the other protocol. For example, if many calibrated training examples have been collected for Wi-Fi, the localization model for Wi-Fi may converge to a well-trained, and substantially effective, solution. In order to extend this model to LTE without having to repeat the training data collection experiment for LTE, the locations reported by the Wi-Fi model may be trained into the LTE model. While this example includes two protocols, multiple protocols may be leveraged. According to certain embodiments, multiple protocol device identifiers may be exploited via emitter reconciliation.

According to certain examples, random MAC address reconciliation approaches may be employed. For example, using information that multiple MAC addresses are being localized to a point that is proximate to a point where a LTE device is being localized, it may be determined that the random MAC addresses correspond to one device and that same device may include the located LTE radio.

In block 850, mobile applications can provide location calibration. Positioning information available within a mobile device, such as GPS or user input, may be leveraged to train machine-learning algorithms for performing radio frequency based geolocation. Training can calibrate and/or refine geolocation results.

In block 860, robotic automatons may be employed for calibrating and performance monitoring of radio frequency signal localization. Radio frequency emitters can be mechanically coupled to automatons, mobile robots, drones, or so forth. The automatons can infer their physical locations from a secondary modality such as infrared sensors, wheel encoders, bump sensors, and so forth. The reported physical location information can be used to calibrate or refine the localization models, including machine-learning algorithms applied thereto.

Example Systems

FIG. 9 depicts a computing machine 2000 and a module 2050 in accordance with one or more embodiments presented herein. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 also may include volatile memories, such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attachment ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, biometric readers, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks ("WAN"), local area networks ("LAN"), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

One or more aspects of embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of embodiments of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A method for determining a physical position of a wireless device, comprising:
    positioning one or more radio frequency sensors within an electromagnetic environment wherein one or more user equipment devices are serviced by a base station;
    receiving, at the one or more radio frequency sensors, wireless uplink signals transmitted from one or more of the user equipment devices to the base station;

generating data samples from the received signals;
partitioning the data samples in time and frequency to generate spectrum tiles;
statistically aggregating the spectrum tiles to reduce a quantity of the data samples;
applying a clustering algorithm to the statistically aggregated spectrum tiles to determine one or more clusters of spectrum tiles;
computing signal parameters associated with respective clusters of spectrum tiles; and
estimating a physical location associated with one of the user equipment devices based upon the signal parameters associated with the respective cluster of spectrum tiles.

2. The method of claim 1, wherein computing the signal parameters comprises computing signal power levels.

3. The method of claim 1, wherein the wireless uplink signals comprise one of 4G, 5G, and LTE communications.

4. The method of claim 1, further comprising optimizing a physical model for electromagnetic signal propagation by applying a pseudoinverse.

5. The method of claim 1, wherein the statistical aggregation reduces samples in both the time and frequency dimensions.

6. The method of claim 1, further comprising computing a quantity of the user equipment devices based upon the signal parameters associated with the respective clusters of spectrum tiles.

7. The method of claim 1, wherein the statistical aggregation comprises rank statistics.

8. The method of claim 1, further comprising tracking motion associated with the radio transmitter using a Kalman filter.

9. The method of claim 1, further comprising tracking motion associated with the radio transmitter using a particle filter.

10. The method of claim 1, further comprising incorporating angulation data associated with the one or more radio frequency sensors.

11. A system for determining a physical position of a wireless device, comprising:
one or more sensor antennas;
one or more radio frequency sensors configured to couple radio frequency signals from the one or more sensor antennas and generate data samples representing at least a portion of the radio frequency signals; and
a signal analysis engine comprising one or more processing units, and one or more processing modules configuring the one or more processing units to:
partition the data samples in time and frequency to generate spectrum tiles,
statistically aggregate the spectrum tiles to reduce a quantity of the data samples,
apply a clustering algorithm to the statistically aggregated spectrum tiles to determine one or more clusters of spectrum tiles,
compute signal parameters associated with respective clusters of spectrum tiles; and
estimate a physical location associated with the wireless device based upon the signal parameters associated with the respective cluster of spectrum tiles.

12. The system of claim 11, wherein computing the signal parameters comprises computing signal power levels.

13. The system of claim 11, wherein the wireless uplink signals comprise one of 4G, 5G, and LTE communications.

14. The system of claim 11, further comprising configuring the one or more processing units to optimize a physical model by applying a pseudoinverse.

15. The system of claim 11, wherein the statistical aggregation reduces samples in both the time and frequency dimensions.

16. The system of claim 11, further comprising computing a quantity of wireless devices based upon the signal parameters associated with the respective clusters of spectrum tiles.

17. The system of claim 11, wherein the statistical aggregation comprises rank statistics.

18. The system of claim 11, wherein the one or more processing units are further configured to track motion associated with the radio transmitter using a Kalman filter.

19. The system of claim 11, wherein the one or more processing units are further configured to track motion associated with the radio transmitter using a particle filter.

20. A system for determining a physical position of a wireless device, comprising:
one or more radio frequency sensor antennas within an electromagnetic environment;
one or more operator interfaces for communicating information associated with wireless devices; and
a signal analysis engine comprising one or more processing units, and one or more processing modules configuring the one or more processing units to:
receive, from the one or more radio frequency sensor antennas, wireless uplink signals transmitted from one or more wireless devices to a base station,
generate data samples from the received signals,
establish a physical model for electromagnetic signal propagation within the electromagnetic environment,
partition the data samples in time and frequency to generate spectrum tiles,
statistically aggregate the spectrum tiles to reduce a quantity of the data samples in both time and frequency dimensions,
apply a clustering algorithm to the statistically aggregated spectrum tiles to determine one or more clusters of spectrum tiles,
compute signal power levels associated with respective clusters of spectrum tiles; and
estimate a physical location associated with one of the clusters of spectrum tiles based upon the physical model and the signal power levels, and
present the estimated physical location to the one or more operator interfaces.

* * * * *